United States Patent [19]

Vink et al.

[11] 4,323,588

[45] Apr. 6, 1982

[54] AERATED CONFECTIONS

[75] Inventors: Walter Vink, Purdys Station; Leonard Spooner, Port Chester; Donald A. M. Mackay, Pleasantville, all of N.Y.

[73] Assignee: Life Savers, Inc., New York, N.Y.

[21] Appl. No.: 175,985

[22] Filed: Aug. 7, 1980

[51] Int. Cl.³ ............................................. A23G 3/00
[52] U.S. Cl. .................................. 426/564; 426/568; 426/571; 426/660
[58] Field of Search ............... 426/572, 565, 567, 564, 426/658, 660, 548

[56] References Cited

U.S. PATENT DOCUMENTS

| | | | |
|---|---|---|---|
| 3,556,811 | 1/1971 | Smith | 426/660 |
| 3,586,513 | 6/1971 | Horn et al. | 426/572 |
| 3,865,957 | 2/1975 | Schiweck | 426/548 |
| 3,976,803 | 8/1976 | Koppijn | 426/572 |
| 4,117,173 | 9/1978 | Schiweck | 426/548 |
| 4,120,987 | 10/1978 | Moore | 426/572 |

Primary Examiner—Jeanette M. Hunter
Attorney, Agent, or Firm—Lawrence S. Levinson; Burton Rodney

[57] ABSTRACT

An aerated confection, such as marshmallow or nougat, which has good stability, can be deposited or extruded, will not collapse and can be subjected to high humidity. The aerated confection is preferably sugarless and contains a hydrogenated starch hydrolysate together with a hydrogenated sugar, such as isomaltitol.

17 Claims, No Drawings

AERATED CONFECTIONS

FIELD OF THE INVENTION

The present invention relates to aerated confections, such as marshmallow or nougat, preferably of the sugarless variety, which can be deposited or extruded and is surprisingly stable and contains a hydrogenated starch hydrolysate and a hydrogenated sugar, such as isomaltitol.

BACKGROUND OF THE INVENTION

Historically, one of the most difficult confection products to prepare is an aerated confection, such as marshmallow or nougat. The product requires the proper blend of crystallized and dissolved carbohydrates in conjunction with a whipping agent, such as egg whites, gelatine, or vegetable protein.

Aerated confections are even more difficult to prepare in a "sugarless" format due to the hygroscopicity and solubility of polyhydric alcohols, such as sorbitol, which are normally used as sweetener and bulking agent.

DESCRIPTION OF THE INVENTION

In accordance with the present invention, there is provided a novel and highly aerated confection, such as marshmallow or nougat, which contains as bulking agent and sweetener a combination of a hydrogenated starch hydrolysate and a hydrogenated sugar as well as a whipping agent, and optionally additional sweetener and/or flavorant, and fat in the case of a nougat confection. The aerated product of the invention as described above, especially in sugarless form has been found to be surprisingly stable in that unlike sorbitol aerated confections, it will not collapse upon storage and can be subjected to the high humidity conditions encountered in the home. In addition, the above-described aerated product may be deposited or extruded and can be processed using conventional manufacturing techniques.

In forming the aerated product of the invention, depending upon the type of product desired, the aerated product may contain from about 20 to about 90%, and preferably from about 30 to about 75% by weight hydrogenated sugar and from about 5 to about 60%, and preferably from about 20 to about 50% by weight hydrogenated starch hydrolysate.

In practice, the hydrogenated sugar will be employed in a weight ratio to the hydrogenated starch hydrolysate of within the range of from about 1:1 to about 5:1 and preferably from about 2:1 to about 3:1 depending upon the particular confection.

The aerated confection will also contain from about 0.5 to about 5% and preferably from about 1 to about 3% by weight of a whipping agent, and in the case of a nougat confection, from about 2 to about 20%, and preferably from about 5 to about 10% by weight of a fatty material. The aerated confection may also optionally contain from 0 to about 30% and preferably from 0 to about 5% by weight of other bulking agent/sweetener, such as sorbitol, xylitol and the like, as well as from 0 to about 2%, and preferably from about 0 to about 0.5% by weight artificial sweetener, and optionally from 0 to about 10% and preferably from about 0.15 to about 5% by weight flavoring. In addition, the product may contain from about 5 to about 30% and preferably from about 15 to about 25% by weight water.

The hydrogenated sugar which is employed in the aerated confection of the invention may be isomaltitol as described in U.S. Pat. No. 3,865,957 to Schiweck et al and preferably is hydrogenated isomaltulose which is a mixture, preferably equimolar, of α-D-glucopyranosyl-1,6-sorbitol (isomaltitol) and α-D-glucopyranosyl-1,6-mannitol which is described in U.S. Pat. No. 4,117,173 to Schiweck et al. The above equimolar mixture is also identified as Palatinit, a trademark of the South German Sugar Company, Mannheim, Germany.

The hydrogenated starch syrup also referred to as hydrogenated starch hydrolysates, employed herein may include those disclosed in reissue U.S. Pat. No. Re. 25,959 or U.S. Pat. No. 3,556,811 as well as various hydrogenated glucose syrups and/or powders which contain sorbitol, hydrogenated disaccharides, hydrogenated tri- to hexa-saccharides, and hydrogenated higher polysaccharides, or mixtures of any two or more of the above.

The hydrogenated glucose syrups and/or powders may be produced by catalytic hydrogenation of standard glucose syrups (acid and/or enzyme converted) to the point where all the glucose end groups of the saccharides are reduced to alcohols, that is, dextrose end groups to sorbitol end groups. In the case of hydrogenated glucose syrups, the total solids are made of from about 4 to about 30% sorbitol, from about 5 to about 65% hydrogenated disaccharides (that is, maltitol), from about 15 to about 75% tri- to hepta-hydrogenated saccharides, and from about 10 to about 65% hydrogenated saccharides higher than hepta.

Examples of particularly suitable hydrogenated starch hydrolysates include from about 6 to about 10% sorbitol, from about 25 to about 55% hydrogenated disaccharides, from about 20 to about 40% hydrogenated tri- to hepta-saccharides, and from about 15 to about 30% hydrogenated saccharides higher than hepta.

Another example of suitable hydrogenated starch hydrolysates include from about 8 to about 20% sorbitol, from about 5 to about 15% hydrogenated disaccharides, and from about 2 to about 75% hydrogenated tri- to penta-saccharides.

Preferred are hydrogenated starch hydrolysates the solids portion of which comprise from about 4 to about 20% and preferably from about 4 to about 14% sorbitol, from about 5 to about 65% and preferably from about 45 to about 60% hydrogenated disaccharides (maltitol), from about 15 to about 75% tri- to hepta-hydrogenated saccharides, and from about 10 to about 65% hydrogenated saccharides higher than hepta (also referred to as Lycasin 80/55-Roquette Freres).

Particularly preferred are hydrogenated starch hydrolysates of the following compositions.

|  | Parts by Weight | | |
| --- | --- | --- | --- |
|  | 1 | 2 | 3 |
| Sorbitol | 10.5 | 17 | 15 |
| Hydrogenated disaccharides | 7.5 | 13 | 10 |
| Hydrogenated tri- to penta-saccharides | 20 | 70 | 40 |
| Hydrogenated saccharides higher than penta and higher saccharide alcohols | 62 | 0 | 35 |
|  | 4 | 5 | 6 | 7 |

-continued

|  | Parts by Weight | | | |
|---|---|---|---|---|
| Sorbitol | 5–8 | 6–8 | 6–8 | 5–8 |
| Hydrogenated disaccharides | 50–58 | 40–45 | 25–30 | 25–58 |
| Hydrogenated tri- to hexa-saccharides | 20–25 | 25–30 | 35–40 | 20–40 |
| Hydrogenated saccharides higher than hexa | 15–20 | 20–25 | 25–30 | 15–30 |

The whipping agent which may be employed herein may comprise any conventional whipping agent, such as egg whites, gelatine, vegetable protein and the like.

Flavors which may be added in forming the aerated product of the invention comprise flavor oils, including acids, such as adipic, succinic, malic and fumaric acid, citrus oils, such as lemon oil, orange oil, lime oil, grapefruit oil, fruit essences, such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the aerated product.

In addition, as mentioned hereinbefore, the confection of the invention may include artificial sweeteners, such as sodium, calcium or ammonium saccharin salts, dihydrochalcones, glycyrrhizin, dipotassium glycyrrhizin, glycyrrhizic acid ammonium salt, L-aspartyl-L-phenylalanine methyl ester, as well as *Stevia rebaudiana* (Stevioside) *Richardella dulcifica* (Miracle Berry), *Dioscoreophyllum cumminsii* (Serendipity Berry), cyclamate salts, and the like, or mixtures of any two or more of the above.

Where the aerated product comprises a nougat candy, examples of fatty materials which may be employed therein include, but are not limited to coconut oil, palm kernel oil, cottonseed oil and butter.

The aerated confection of the invention may be formed by simply mixing the hydrogenated sugar, hydrogenated starch hydrolysate, water and other sweetener or flavor and cooking the mixture at a temperature of from about 230° to about 280° F., and preferably from about 240° to about 260° F.

The cooked mixture is allowed to cool, for example down to 150° F. or below, whipping agent dispersed in water and in hydrated form is added to the cooled cooked syrup and the mix is allowed to cool to 120° F. or below. Thereafter, the batch is whipped, for example, using a vertical beater, to a density of 33 to 48 ounces per gallon. The whipped mix is then deposited in molds or extruded as desired and allowed to set to form the aerated product of the invention.

Where the aerated confection is to be a nougat, a fatty material may be mixed with the hydrogenated sugar, hydrogenated starch hydrolysate, water, sweetener and flavor before or after the cooking step.

The following Examples represent preferred embodiments of the present invention.

EXAMPLE 1

A marshmallow having the following composition is prepared as described below.

| Ingredient | Parts by Weight |
|---|---|
| Hydrogenated sugar (equimolar mixture of α-D-glucopyranosyl-1,6-sorbitol and α-D-glucopyranosyl-1,6-mannitol - Palatinit) | 50 |
| Hydrogenated starch hydrolysate (78% solids including 6% sorbitol and 56% maltitol - Lycasin 80/55) | 50 |
| Water | 30 |
| Gelatine Type A 250 Bloom | 2.4 |
| Water for gelatine | 7.5 |
| Sodium saccharin as flavor | .15 |

The hydrogenated sugar, hydrogenated starch hydrolysate, sodium saccharin, and water are combined and cooked atmospherically to 240° F. This is allowed to cool to 140° F.

The gelatine is dispersed in the water and allowed to completely hydrate. At 140° F., the gelatine is added to the cooked syrup and the mix allowed to cool to 100° F.

At 100° F., the batch is whipped using a vertical beater, to a density of 32–48 oz. per gallon. This aerated mix is then formed and allowed to set. The product thereby produced is a sugarless shelf stable, pleasant tasting aerated confection.

EXAMPLE 2

A grained nougat having the following composition is prepared as described below.

| Ingredient | Parts by Weight |
|---|---|
| Egg albumin | 1.2 |
| Water | 3.6 |
| Hydrogenated sugar (equimolar mixture of α-D-glucopyranosyl-1,6-sorbitol and α-D-glucopyranosyl-1,6-mannitol - Palatinit) | 42.3 |
| Hydrogenated starch hydrolysate (78% solids including 6% sorbitol and 56% maltitol - Lycasin 80/55) | 42.8 |
| Confectioner's fat | 10.0 |
| Sodium saccharin | 0.1 |

4 oz. Egg albumin, 12 oz. water and 14 oz. hydrogenated sugar are weighed into a vertical beater bowl. The cold mixture is hand mixed and then mixed with a leaf paddle of the vertical beater run on low speed until smooth and creamed.

A mix formed of 6 lbs. 11 oz. hydrogenated sugar, 8 lbs. 8 oz. hydrogenated starch hydrolysate, 2 lbs. water and 0.02 lb sodium saccharin are added to a cooking kettle and cooled to 260° F.

While the batch is cooking, the cold mixture is whipped by the beater on high speed for 6 minutes or until maximum volume and stiffness has developed. Meanwhile, the fat is melted and the temperature adjusted to approximately 140° F.

15 oz. Of hydrogenated sugar are weighed out and held to add to the batch.

When the cooked batch has reached desired temperature and the cold mix has been whipped fully, the mixer is slowed to medium speed and the cooked batch added slowly. After one minute of mixing on medium speed, the mixer is turned to the slowest speed and the hydrogenated sugar, fat, salt, and flavor are added. The mix is mixed at low speed until the batch flows together which indicates the fat is well incorporated. Thereafter, the mix is poured into molds and allowed to cool. The resulting product is a shelf stable sugarless aerated grained nougat which is pleasant tasting.

What is claimed is:

1. An aerated confection having good stability consisting essentially of from about 20 to about 90% by weight of a hydrogenated sugar which is isomaltitol or a mixture of isomaltitol and α-D-glucopyranosyl-1,6-mannitol, from about 5 to about 60% by weight of a hydrogenated starch hydrolysate and from about 0.5 to about 5% by weight of a whipping agent.

2. The aerated confection as defined in claim 1 in sugarless form.

3. The aerated confection as defined in claim 1 in the form of marshmallow or nougat.

4. The aerated confection as defined in claim 1 wherein said hydrogenated sugar is isomaltitol.

5. The aerated confection as defined in claim 1 wherein said hydrogenated sugar is an equimolar mixture of isomaltitol and α-D-glucopyranosyl-1,6-mannitol.

6. The aerated confection as defined in claim 1 wherein said hydrogenated starch hydrolysate is prepared by hydrogenating saccharified starch having a dextrose equivalent of 15-75% and containing dextrines until substantially no dextrose and maltose remain.

7. The aerated confection as defined in claim 1 wherein said hydrogenated starch hydrolysate comprises from about 72% to about 80% of solids of which from about 4 to about 20% is sorbitol, from about 5 to about 65% is hydrogenated disaccharides, from about 15 to about 75% is tri- to hepta-hydrogenated saccharides, and from about 10 to about 65% is hydrogenated saccharides higher than hepta.

8. The aerated confection as defined in claim 1 wherein said solids portion of said hydrogenated starch hydrolysate contains from about 6 to about 10% sorbitol, and from about 25 to about 55% by weight hydrogenated disaccharides, from about 20 to about 40% hydrogenated tri- to hepta-saccharides, and from about 15 to about 30% hydrogenated saccharides higher than hepta.

9. The aerated confection as defined in claim 1 wherein said solids portion of said hydrogenated starch hydrolysate contains from about 8 to about 20% sorbitol, and from about 5 to about 15% by weight hydrogenated disaccharides, and from about 20 to about 75% hydrogenated tri- to penta-saccharides.

10. The aerated confection as defined in claim 1 wherein said hydrogenated starch hydrolysate comprises from about 5 to about 8% sorbitol, from about 25 to about 58% hydrogenated disaccharides, from about 20 to about 40% hydrogenated tri- to hexa-saccharides and from about 15 to about 30% hydrogenated saccharides higher than hexa.

11. The aerated confection as defined in claim 1 wherein said hydrogenated sugar is present in an amount within the range of from about 30 to about 75% by weight of said confection.

12. The aerated confection as defined in claim 1 wherein said hydrogenated starch hydrolysate is present in an amount within the range of from about 20 to about 50% by weight of said confection.

13. The aerated confection as defined in claim 1 wherein said hydrogenated sugar is present in a weight ratio to the hydrogenated starch hydrolysate of within the range of from about 1:1 to about 5:1.

14. The aerated confection as defined in claim 1 wherein said confection is in the form of a nougat and contains from about 2 to about 20% by weight of a fatty material.

15. The aerated confection as defined in claim 1 wherein said whipping agent is present in an amount of from about 1 to about 3% by weight of said confection.

16. The aerated confection as defined in claim 1 wherein said whipping agent is egg white, gelatine or vegetable protein.

17. The aerated confection as defined in claim 1 wherein said hydrogenated sugar is an equimolar mixture of α-D-glucopyranosyl-1,6-sorbitol and α-D-glucopyranosyl-1,6-mannitol and said hydrogenated starch hydrolysate contains at least 3% of polyols of a degree of polymerization higher than 20, from about 45 to about 60% maltitol, and from about 4 to about 14% sorbitol.

* * * * *